United States Patent [19]

Kawai et al.

[11] Patent Number: 5,725,052
[45] Date of Patent: Mar. 10, 1998

[54] DUAL ZONE AIR-CONDITIONING SYSTEM FOR MOTOR VEHICLES WITH IMPROVED AIR FLOW RATE

[75] Inventors: Takayoshi Kawai, Hoi-gun; Tomohisa Yoshimi, Gamagouri; Yuji Honda; Tomotsugu Terada, both of Okazaki; Yuji Ito, Ichinomiya; Katsuhiko Samukawa, Obu, all of Japan

[73] Assignee: Nippondenso Co., Ltd., Kariya, Japan

[21] Appl. No.: 315,962

[22] Filed: Sep. 30, 1994

[30] Foreign Application Priority Data

Oct. 1, 1993 [JP] Japan ................. 5-247235
Dec. 17, 1993 [JP] Japan ................. 5-317948

[51] Int. Cl.$^6$ .................... F25B 29/00; B60H 1/00
[52] U.S. Cl. ............... 165/203; 165/42; 165/43; 236/49.3; 236/1 B; 454/75
[58] Field of Search ............... 165/42, 43, 203; 236/1 B, 49.3; 454/75

[56] References Cited

U.S. PATENT DOCUMENTS

| | | | |
|---|---|---|---|
| 4,406,397 | 9/1983 | Kamata et al. | 236/1 B |
| 4,460,036 | 7/1984 | Yoshimi et al. | 165/42 |
| 4,482,009 | 11/1984 | Nishimura et al. | 165/203 |
| 4,533,080 | 8/1985 | Clark et al. | 236/49.3 |
| 4,537,245 | 8/1985 | Nishimura et al. | 236/49.3 |
| 4,919,195 | 4/1990 | Tanino | 165/43 |
| 5,074,463 | 12/1991 | Suzuki et al. | 236/49.3 |
| 5,209,397 | 5/1993 | Arold et al. | 165/43 |

FOREIGN PATENT DOCUMENTS

| | | |
|---|---|---|
| 56157107 | 4/1955 | Japan . |
| 57 86813 | 11/1955 | Japan . |
| 58-33509 | 2/1983 | Japan . |

*Primary Examiner*—John K. Ford
*Attorney, Agent, or Firm*—Cushman, Darby & Cushman IP Group of Pillsbury Madison & Sutro LLP

[57] ABSTRACT

An air-conditioning apparatus for allowing the temperatures of a first air-conditioning zone and a second air-conditioning zone to quickly approach the respective set temperatures by properly controlling the air flow rate and the ratio of fresh/recirculated air, even when the set temperatures differ from one another. The device includes a controller that determines whether the system is in a transitional period or in a steady state based on the deviation of the compartment temperature detected by the compartment temperature sensor from the first and second set temperatures for the first and second zones. If a determination is made that the system is in a transitional period, the controller acts to determine the flow rates of air being supplied to respective blowers as well as making the determination concerning the guidance ratio of the fresh to recirculated air.

9 Claims, 8 Drawing Sheets

DUAL ZONE AIR-CONDITIONING SYSTEM FOR MOTOR VEHICLES WITH IMPROVED AIR FLOW RATE

CROSS REFERENCE TO RELATED APPLICATIONS

This application is based upon and claims priority from Japanese Patent Applications 5-247235 filed Oct. 1, 1993 and 5-317948 filed Dec. 17, 1993.

BACKGROUND OF THE INVENTION

1. Field of the Invention

The present invention generally relates to an air-conditioning system for a motor vehicle. More particularly, the present invention relates to an air-conditioning system for a motor vehicle which separately air-conditions different air-conditioning zones in the passenger compartment of the vehicle.

2. Related Art

As an example of the air-conditioning system for a motor vehicle that separately air-conditions different air-conditioning zones in a passenger compartment, an air-conditioning system that separately air-conditions the driver side and passenger side within the passenger compartment has been proposed in JP-A-58-33509. This air-conditioning system for a motor vehicle comprises a driver side air passage (first passage) for directing the air conditioning air to the driver side and a passenger side air passage (second passage) for directing the air conditioning air to the passenger side and an air blower for blowing air within the first passage and the second passage towards the compartment. This air-conditioning system for a motor vehicle further comprises a driver side temperature setting means (first temperature setting means) for setting the temperature of the air-conditioning zone at the driver side (first air-conditioning zone) and a passenger side temperature setting means (second temperature setting means) for setting the temperature of the air-conditioning zone at the passenger side (second air-conditioning zone).

Furthermore, the first passage and the second passage comprise respective temperature controlling means for controlling the temperature of the air being directed to the respective compartments. Here, the temperature controlling means is controlled by a controller so that the temperature of the first air-conditioning zone can be regulated to the set temperature set by the first temperature setting means and the temperature of the second air-conditioning zone can be regulated to the set temperature set by the second temperature setting means.

The air flow rate of the air blower is controlled to the mean value of the air flow rate adequate to the first air-conditioning zone and the air flow rate adequate to the second air-conditioning zone. Specifically, the air flow rate of the air blower is determined based on the mean value of a first target temperature (target temperature of the air blown from the first passage) set based on the set temperature of the first temperature setting means and on the compartment temperature and a second target temperature (target temperature of the air blown from the second passage) set based on the set temperature of the second temperature setting means and on the compartment temperature.

Alternatively, the air flow rate is controlled to the mean value (e.g., mean applied voltage) of a first air flow rate (e.g., first applied voltage) set based on the first set temperature and on the compartment temperature and a second air flow rate (e.g., second applied voltage) set based on the second set temperature and on the compartment temperature.

The conventional air-conditioning system for a motor vehicle comprises a fresh/recirculated air selection means for selecting the air from the outside of the compartment (fresh air) or the air from the inside of the compartment (recirculated air) and guiding the selected air into the first passage and the second passage. This fresh/recirculated air selection means is controlled to the mean condition of the fresh/recirculated air guiding condition adequate to the first air-conditioning zone and the fresh/recirculated air guiding condition adequate to the second air-conditioning zone. Specifically, the ratio of the fresh/recirculated air guided into the system by the fresh/recirculated air selecting means is determined based on the mean value of the first target temperature set based on the first set temperature and on the compartment temperature and the second target blowout temperature set based on the second set temperature and on the compartment temperature.

When air-conditioning is begun or the set temperature is changed, the deviation of the detected compartment temperature from the set temperature is large (transition period). Therefore, during the transition period with a large deviation, a high air flow rate is required to quickly reduce the deviation.

However, in some air-conditioning systems which separately control the temperatures of the first air-conditioning zone and the second air-conditioning zone, the set temperature of the first air-conditioning zone is different from the set temperature of the second air-conditioning zone. If the set temperature of the first air-conditioning zone is different from the set temperature of the second air-conditioning zone, the mean air flow rate of the air flow rate adequate to the first air-conditioning zone and the air flow rate adequate to the second air-conditioning zone is blown into the compartment as described above. As a result, it takes some time for the compartment temperature to reach the set temperature as indicated in the time chart of FIG. 13.

In the transition period when, for example, a quick cooling is desired, the air-conditioning system is requested to intake recirculated air of a relatively low temperature in order to quickly cool the compartment. However, when the set temperature of the first air-conditioning zone differs from the set temperature of the second air-conditioning zone, the fresh/recirculated air selecting means is controlled to the mean condition of the fresh/recirculated air guidance condition adequate to the first air-conditioning zone and the fresh/recirculated air guiding condition adequate to the second air-conditioning zone as described above. Accordingly, when the set temperature of the first air-conditioning zone differs from the set temperature of the second air-conditioning zone, the guidance air flow rate of the fresh air (hot outdoor air) increases at an early stage, and as a result, the temperature of the first air-conditioning zone and the temperature of the second air-conditioning zone fail to quickly approach the respective set temperatures.

SUMMARY OF THE INVENTION

In view of the above problems, the present invention has as an object the provision of an air-conditioning system for a motor vehicle which allows the temperature of the first air-conditioning zone and the temperature of the second air-conditioning zone to quickly approach the set temperatures for each zone even when the set temperatures differ from each other.

The air-conditioning system for a motor vehicle according to the present invention relies on the following novel constructions in order to solve the problems of the prior art.

An air-conditioning system for a motor vehicle according to the present invention includes a first passage for sending air to the first air-conditioning zone in a passenger compartment. A second passage directs air to the second air-conditioning zone within the passenger compartment. Within the first and second passages, an air blower is disposed for blowing air towards the passenger compartment. First and second temperature setting devices are used to set the temperatures of the first and second air-conditioning zones respectively. In the compartment, a temperature sensor detects the air temperature therein. A controller determines an air flow rate of the air blower based on the temperature set by the first and second temperature setting devices and the compartment temperature detected by the compartment temperature sensor.

The controller also includes a transition period judging device that judges the apparatus to be in a transitional period when the first deviation of the compartment temperature, detected by the compartment temperature sensor, from the first set temperature is larger than a specified value or when the second deviation of the compartment temperature, detected by the compartment temperature sensor, from the second set temperature is larger than the specified value. An air flow rate compensating device increases the air flow rate of the air blower based on the mean value of the first deviation and second deviation when the system is judged to be in a transitional period.

Alternatively, the controller may include a transitional period judging device that judges the system to be in a transitional period when the first deviation of the compartment temperature, detected by the compartment temperature sensor, from the first set temperature is larger than a specified value or when the second deviation of the compartment temperature, detected by the compartment temperature sensor, from the second set temperature is larger than the specified value. An air flow rate compensating device increases the air flow rate of the air blower based on either the first deviation or the second deviation, whichever is larger, which is determined by comparison the two values when the system is judged to be in a transitional period.

Further still, the controller may simply include an air flow rate determining device for determining the air flow rate of the air blower based on the first deviation of the compartment temperature, detected by the compartment temperature sensor, from the first set temperature or the second deviation of the compartment temperature, detected by the compartment temperature sensor, from the second set temperature, whichever is larger, with the larger being found by comparing the two values.

It is also possible that the controller be designed so as to have a fresh/recirculated air determination device that determines a fresh/recirculated air selection state by using a fresh/recirculated air selection device, which is based on the first set temperature, the second set temperature, and the compartment temperature detected by the compartment temperature sensor.

In this design, the controller further includes a transitional period judgment device for determining that the system is in a transitional period when the first deviation of the compartment temperature, detected by the compartment temperature sensor, from the first set temperature is larger than a specified value or when the second deviation of the compartment temperature, detected by the compartment temperature sensor, from the second set temperature is larger than the specified value. The controller also includes a fresh/recirculated air compensation device for determining the selection state of the fresh/recirculated air by using the fresh/recirculated air selection device, based on the first deviation or the second deviation, whichever is larger, with the larger being determined by comparison, when the system is judged to be in a transitional period.

Finally, the controller may be designed so as to have a fresh/recirculated air determination device, which determines the fresh/recirculated air selection state based on the first deviation of the compartment temperature, detected by the compartment temperature sensor, from the first set temperature or the second deviation of the compartment temperature, detected by the compartment temperature detecting means, from the second set temperature, whichever is determined to be larger via comparison.

When the transition period judging device determines that the system is in a transitional period, the air flow rate compensating device determines the air flow rate to a value larger than the air flow rate determined based on the mean value of the first deviation and the second deviation. That is, in the transitional period, as the air flow rate is determined to a value larger than the air flow rate in the steady state, the air is blown into the compartment at a higher rate.

When the transition period judging device determines that the system is in a transitional period, the air flow rate compensating device compares the first deviation with the second deviation and determines the air flow rate based on the larger deviation. That is, in the transitional period, because the air flow rate is determined based on the larger deviation, a high flow rate of the air is blown into the compartment.

When the air flow rate determining device compares the first deviation with the second deviation and determines the air flow rate based on the larger deviation, air is blown into the compartment at a higher rate, even if the system is in a transitional period.

When the transition period judging device determines that the system is in a transitional period, the fresh/recirculated air compensating means compares the first deviation with the second deviation and determines based on the larger deviation the selecting condition of the fresh/recirculated air or the guidance ratio of the fresh air to the recirculated air. That is, during the transitional period, as the flow rate of the fresh/recirculated air is determined based on the larger deviation, the recirculated air is blown out at a higher rate for quick cooling, and the fresh air is blown out at a higher rate for quick heating, for example.

When the first deviation is compared with the second deviation, the fresh/recirculated air determining device determines based on the larger deviation the selecting condition of the fresh/recirculated air or the guidance ratio of the fresh air to the recirculated air. That is, as the flow rate of the fresh air or recirculated air is determined always based on the larger deviation, the recirculated air is blown out at a higher flow rate in quick cooling (in the transition period) and the fresh air is blown out in a higher flow rate in quick heating (in the transition period), for example.

BRIEF DESCRIPTION OF THE DRAWINGS

Other objects, features and characteristics of the present invention will be apparent to one skilled in the art from a study of the following pages in connection with the following detailed description, the appended drawings, and the claims, all of which form a part of this specification. In the drawings:

DETAILED DESCRIPTION OF THE PRESENTLY PREFERRED EXEMPLARY EMBODIMENTS

Figure 1:
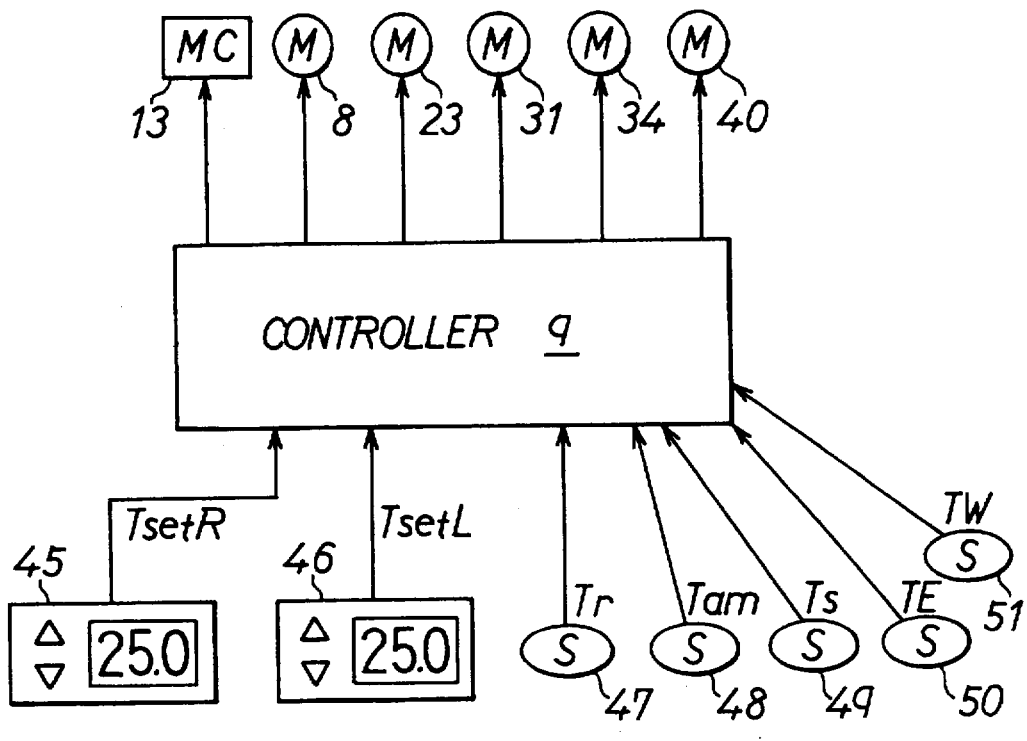
FIG. 1 is a block diagram of the controller for an air conditioning system for a motor vehicle according to the present invention.

The air-conditioning system for a motor vehicle according to the present invention will now be described referring to embodiments illustrated in the drawings.

Figure 2:
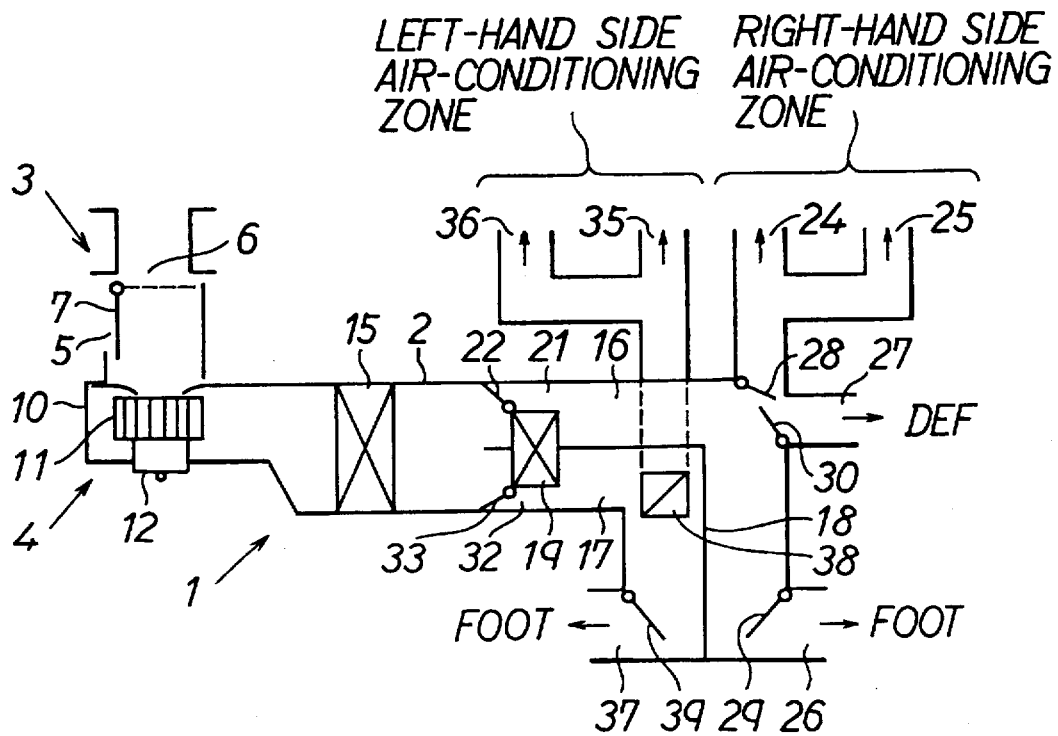
FIG. 2 is a schematic view illustrating the air-conditioning system for a motor vehicle according to the present invention.

FIGS. 1 through 6 illustrate the first embodiment of the present invention with FIG. 2 being a schematic drawing illustrating an air-conditioning system for motor vehicles.

Air-conditioning system 1 is equipped with duct 2 that includes an air passage for feeding air to a compartment. Duct 2 is disposed within a compartment, and to one end of duct 2 is connected air blower 4 equipped with fresh/recirculated air selecting means 3.

Fresh/recirculated air selecting means 3 is equipped with recirculated air inlet 5 that communicates with the inside of the compartment to introduce the recirculated air. Further, fresh/recirculated air selecting means 3 includes a fresh air inlet 6 that communicates with the outside of the compartment to introduce the fresh air. Also, fresh/recirculated air selecting means 3 is equipped with fresh/recirculated air selector damper 7 that selects the air introduced into duct 2 from either the recirculated air or the fresh air. Here, fresh/recirculated air selection actuator 8 (FIG. 1) for driving fresh/recirculated air selector damper 7 is electrically controlled by a controller 9 (described later).

Air blower 4 includes fan case 10, fan 11, and motor 12. Motor 12 rotatably drives fan 11 according to the applied voltage to send recirculated or fresh air to the passenger compartment through duct 2. Motor 12 is electrically controlled by the controller 9 (described later) via motor driving circuit 13 (FIG. 1).

Towards the upstream end of duct 2 and filling the entire duct, evaporator 15 is disposed with refrigerating cycles for cooling the air passing through the duct 2. Downstream from evaporator 15, duct 2 is partitioned by partition wall 18 into first passage 16 for blowing air to the air-conditioning zone at the right side of the compartment (a first air-conditioning zone according to the present invention) and second passage 17 for blowing air to the air-conditioning zone at the left side of the compartment (a second air-conditioning zone according to the present invention). At the upstream end of partition wall 18 and extending through partition wall 18, heater core 19 heats the air passing through first passage 16 and second passage 17 by using the engine cooling water (hot water) as a heat source.

At the upstream end of first passage 16, right-hand side bypass 21 bypasses heater core 19. The volume ratio of the air passing through heater core 19 to the air passing through right-hand side bypass 21 is regulated by right-hand side air mix damper 22. Right-hand side air mix damper 22 includes a right-hand side temperature changing means according to the present invention, and changes the temperature of the air blown from first passage 16 to the right-hand side air-conditioning zone by varying the volume ratio of the air passing through heater core 19 to the air passing through right-hand side bypass 21. Here, right-hand side temperature regulating actuator 23 (FIG. 1) for driving right-hand side air mix damper 22 is electrically controlled by the controller 9 (described later).

At the distal downstream end of the first passage 16, diffusers are positioned so as to blow out the air passing through first passage 16 towards various parts of a crew member ("driver") in the right-hand side air-conditioning zone. The diffusers consist of right-hand side center face diffuser 24 for blowing out mainly cold air from the front center part of the compartment towards the head and chest of the driver, right-hand side side face diffuser 25 for blowing out mainly cold air from the front side part of the compartment towards the head and chest of the driver, right-hand side foot diffuser 26 for blowing out mainly hot air towards the feet of the driver, and defroster diffuser 27 for blowing out mainly hot air towards the front windshield.

At a place leading to right-hand side center face diffuser 24 and right-hand side side face diffuser 25 is provided right-hand side face damper 28 for regulating the flow rate of the air flowing to diffusers 24 and 25. At places leading to right-hand side foot diffuser 26 and defroster diffuser 27, right-hand side foot damper 29 and a defroster damper 30 are respectively positioned so as to control the flow rate of the air flowing to diffusers 26 and 27. Here, right-hand side mode selection actuator 31 (FIG. 1) for driving right-hand side face damper 28, right-hand side foot damper 29 and defroster damper 30 is electrically controlled by the controller 9 (described later).

Also, at the upstream end of second passage 17, left-hand side bypass passage 32 bypasses heater core 19. The volume ratio of the air passing through heater core 19 to air passing through left-hand side bypass passage 32 is regulated by left-hand side air mix damper 33. Left-hand side air mix damper 33 includes the left-hand side temperature changing means according to the present invention, and changes the temperature of the air blown from second passage 17 to the left-hand side air-conditioning zone by varying the volume ratio of the air passing through heater core 19 to the air passing through left-side bypass passage 32. Here, left-hand side temperature regulating actuator 34 (FIG. 1) for driving left-hand side air mix damper 33 is electrically controlled by the controller 9 (described later).

At the distal downstream end of second passage 17, diffusers blow the air passing through the second passage 17 towards various parts of a person ("passenger) in the left-hand side air-conditioning zone, second zone. The diffusers include left-hand side center face diffuser 35 for blowing out primarily cold air from the front center part of the compartment towards the head and chest of the passenger, left-hand side side face diffuser 36 for blowing out mainly cold air from the front side part of the compartment towards the head and chest of the passenger, and left-hand side foot diffuser 37 for blowing out mainly hot air towards the feet of the passenger.

At a place leading to left-hand side center face diffuser 35 and left-hand side side face diffuser 36, left-hand side face damper 38 regulates the flow rate of the air flowing to the diffusers 35 and 36. At a place leading to the left-hand side foot diffuser 37, left-hand side foot damper 39 regulates the flow rate of the air flowing to left-hand side foot diffuser 37. Here, left-hand side mode selection actuator 40 (FIG. 1) for driving left-hand side face damper 38 and left-hand side foot damper 39 is electrically controlled by the controller 9 (described later).

Controller 9 is illustrated in FIG. 1. Controller 9 controls the operation of the electrical components that actuate air-conditioning system 1, including fresh/recirculated air selection actuator 8 for driving fresh/recirculated air selector damper 7, motor driving circuit 13 for controlling the electric power supply to motor 12 of air blower 4, and right-hand side mode selection actuator 31 for driving right-hand side face damper 28, right-hand side foot damper 29, and defroster damper 30. Also, controller 9 controls the operation of left-side mode selection actuator 40 for driving left-hand side face damper 38 and left-hand side foot damper 39. Controller 9 also controls right-hand side temperature regulating actuator 23 for driving right-hand side air mix damper 22, as well as left-hand side temperature regulating actuator 34 for driving left-hand side air mix damper 33.

Controller 9, which is computerized, controls the air-conditioning state by controlling each actuator according to input signals and programs. Controller 9 inputs signals from first temperature setting means 45 for manually setting the set temperature TsetR of the right-hand side air-conditioning zone (first zone), second temperature setting means 46 for manually setting the set temperature TsetL of the left-hand side air-conditioning zone (second zone), compartment temperature sensor 47 for detecting the compartment temperature Tr, ambient air temperature sensor 48 for detecting the ambient air temperature Tam, solar radiation quantity sensor 49 for detecting the solar radiation quantity Ts, post-evaporator temperature sensor 50 for detecting the cold air temperature TE of the air passed through the evaporator 15, and water temperature sensor 51 for detecting the temperature of the air passed through heater core 19 and the cooling water temperature TW of the water to be supplied to heater core 19.

Figure 3:
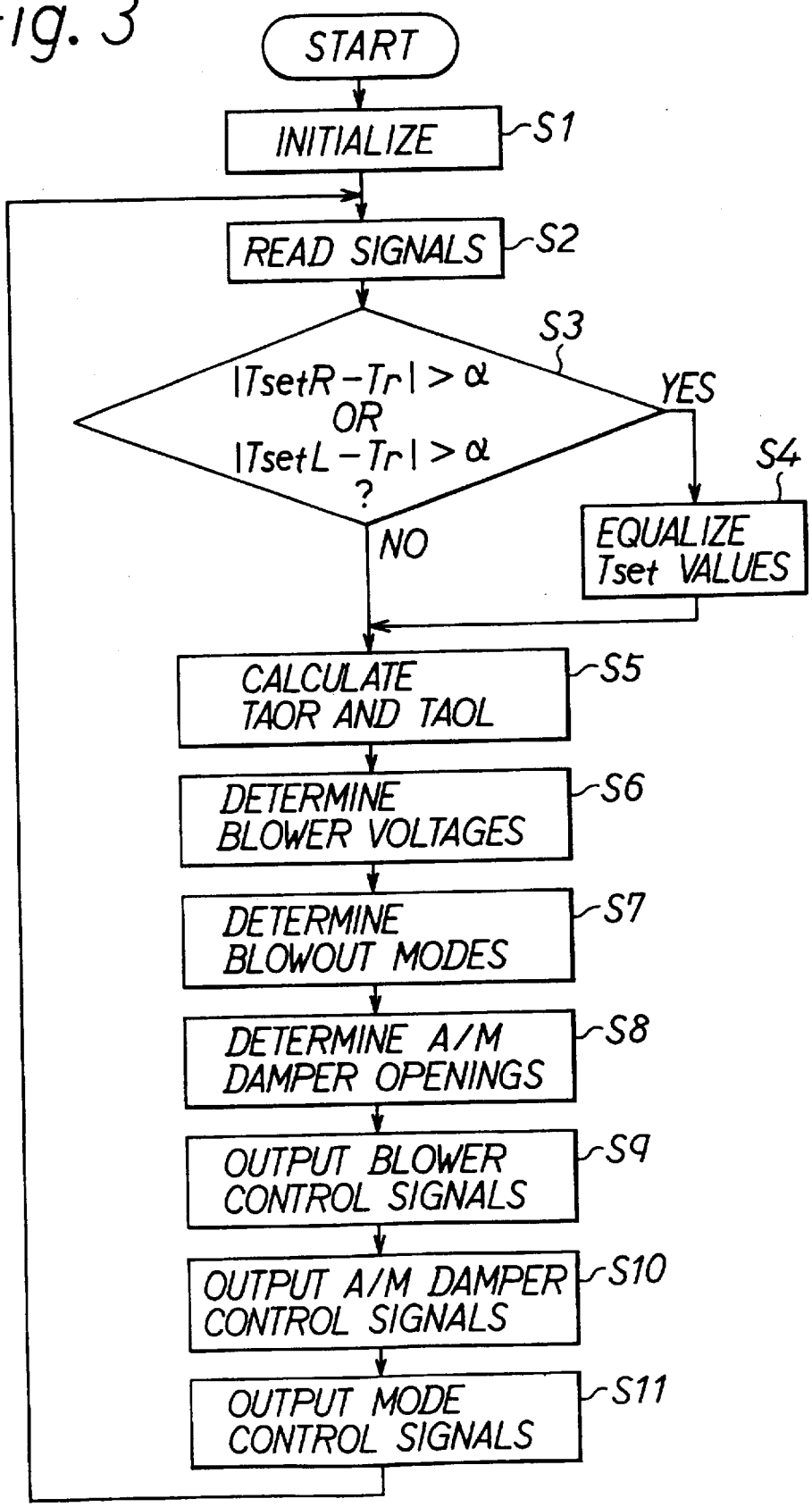
FIG. 3 is a flowchart illustrating the operation of the controller of the first embodiment.
Figure 4:
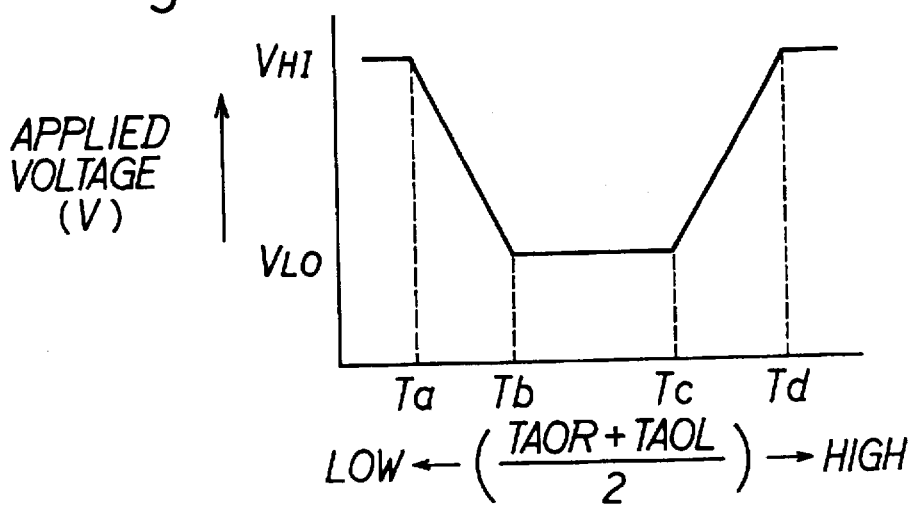
FIG. 4 is a graph illustrating the relationship between the mean value of the target blowout temperatures TAOR and TAOL and the applied voltage V in the first embodiment.
Figure 5:
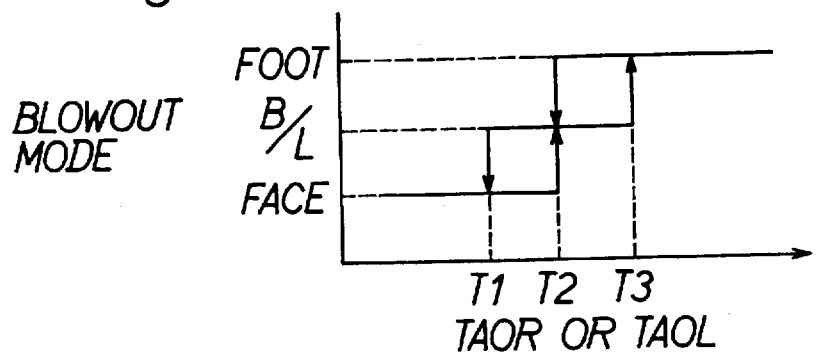
FIG. 5 is a graph illustrating the relationship between the target blowout temperature TAOR or TAOL and the blowout mode in the first embodiment.

The operation of controller 9 in its use to control the air-conditioning system 1 will be described with reference to the flowchart illustrated in FIG. 3.

The process begins with the selection of the automatic air-conditioning mode (START). First, in Step S1, each memory is initialized. In Step S2, the signals of the sensors and setting means (set temperatures TsetR and Tset1, compartment temperature Tr, ambient air temperature Tam, solar radiation quantity Ts, cold air temperature TE and cooling water temperature TW) are read.

In Step S3, a determination is made as to whether the present air-conditioning state is in a transitional period, an operation that corresponds to the operation of the transitional period determination means according to the present invention. To be more specific, when the first deviation of the compartment temperature Tr detected by compartment temperature sensor 47 from the set temperature TsetR set by first temperature setting means 45 (|TsetR−Tr|) is larger than a preset temperature difference $\alpha$ (e.g., 5° C.) or when the second deviation of the compartment temperature Tr detected by compartment temperature sensor 47 from the set temperature TsetL set by second temperature setting means 46 (|TsetL−Tr|) is larger than the preset temperature difference $\alpha$, i.e., when the condition |TsetR−Tr|>$\alpha$ or |TsetL−Tr|>$\alpha$ is satisfied, the system is determined to be in a transitional period. Otherwise, the system is determined to be in the steady state.

When the system is determined to be in a transitional period in Step S3, the first deviation (|TsetR−Tr|) is compared with the second deviation (|TsetL−Tr|), and the set temperature from which the deviation is judged to be smaller is assumed to be the set temperature from which the deviation is judged to be larger. Thus, both the set temperatures are equalized with each other in Step S4, an operation that corresponds to the operation of the air flow rate compensating means according to the present invention. Here, the operation of the air flow rate compensating means of this embodiment will be specifically described. When TsetR−Tr<0 and TsetL−Tr<0, TsetR is compared with TsetL, and the higher set temperature is equalized to the lower set temperature (e.g., when TsetL<TsetR, TsetL←TsetR and TsetR←TsetR.). When TsetR−Tr$\geq$0 and TsetL−Tr$\geq$0, TsetR is compared with TsetL, and the lower set temperature is equalized to the higher set temperature (e.g., when TsetL>TsetR, TsetL←TsetL and TsetL←TsetR.). Furthermore, when TsetR−Tr<0 and TsetL−Tr$\geq$0 or when TsetR−Tr$\geq$0 and TsetL−Tr<0, respective temperatures are adopted (i.e., TsetR←TsetR and TsetL←TsetL).

When the situation is judged to be in a steady state in Step S3 or after Step S4 has been completed, the target blowout temperature TAOR of the air blown out from first passage 16 to the right-hand side air-conditioning zone and the target blowout temperature TAOL of the air blown out from second passage 17 to the left-hand side air-conditioning zone are calculated by the following equations in Step S5.

$$TAOR = Kset \cdot TsetR - Kr \cdot Tr - Kam \cdot Tam - Ks \cdot Ts + Kd(TsetL - TsetR) + C \quad (1)$$

$$TAOL = Kset \cdot TsetL - Kr \cdot Tr - Kam \cdot Tam - Ks \cdot Ts - Kd(TsetL - TsetR) + C \quad (2)$$

where Kset is the temperature setting gain, Kr is the compartment temperature gain, Kam is the ambient temperature gain, Ks is the solar radiation gain, Kd is the temperature difference gain, and C is the coefficient of compensation.

In Step S6, the applied voltage of air blower 4 is determined. In this step, the mean value of the right-hand side and left-hand side target blowout temperatures TAOR and TAOL is calculated at first. Then, the applied voltage V of air blower 4 is determined based on the relation between the above mean value and the applied voltage (see FIG. 4.). Step S6 corresponds to the operation of the flow rate determining means according to the present invention.

In Step S7, the blowout mode of the air to be blown out of first passage 16 and the blowout mode of the air to be blown out of second passage 17 are determined. The blowout mode of the air blown out of first passage 16 is determined from the target blowout temperature TAOR of the right-hand side air-conditioning zone according to FIG. 5. In the same way, the blowout mode of the air blown out of second passage 17 is determined from the target blowout temperature TAOL of the left-hand side air-conditioning zone according to FIG. 5.

Next, in Step S8, the target opening SWR of right-hand side air mix damper 22 and the target opening SWL of left-hand side air mix damper 33 are calculated by using the following equations to achieve the target blowout temperature TAOR at the driver side and the target blowout temperature TAOL at the passenger side respectively.

$$SWR=\{(TAOR-TE)/(TW-TE)\}\times 100(\%) \quad (3)$$

$$SWL=\{(TAOL-TE)/(TW-TE)\}\times 100(\%) \quad (4)$$

In Step S9, control signals are output to the motor driving circuit 13 so that the applied voltage V calculated in the above Step S6 can be applied to air blower 4. In Step S10, control signals are output to right-hand side temperature regulating actuator 23 for driving right-side air mix damper 22 so that the target opening SWR calculated in the above step, Step S8, can be achieved, and at the same time, control signals are output to left-hand side temperature regulating actuator 34 for driving left-hand side air mix damper 33 so that the target opening SWL can be achieved.

Then, in Step S11, control signals are output to right-hand side mode selection actuator 31 so that diffuser(s) for the air blown out of first passage 16 can be selected according to the mode determined in the above step, Step S7, and at the same time, control signals are output to left-hand side mode selecting actuator 40 so that diffuser(s) for the air blown out of second passage 17 can be selected according to the mode determined in the above Step S7.

When the above entire cycle has been completed, the process returns to Step S2 and the cycle is repeated at a frequency of approximately 0.25 Hz.

Figure 6:
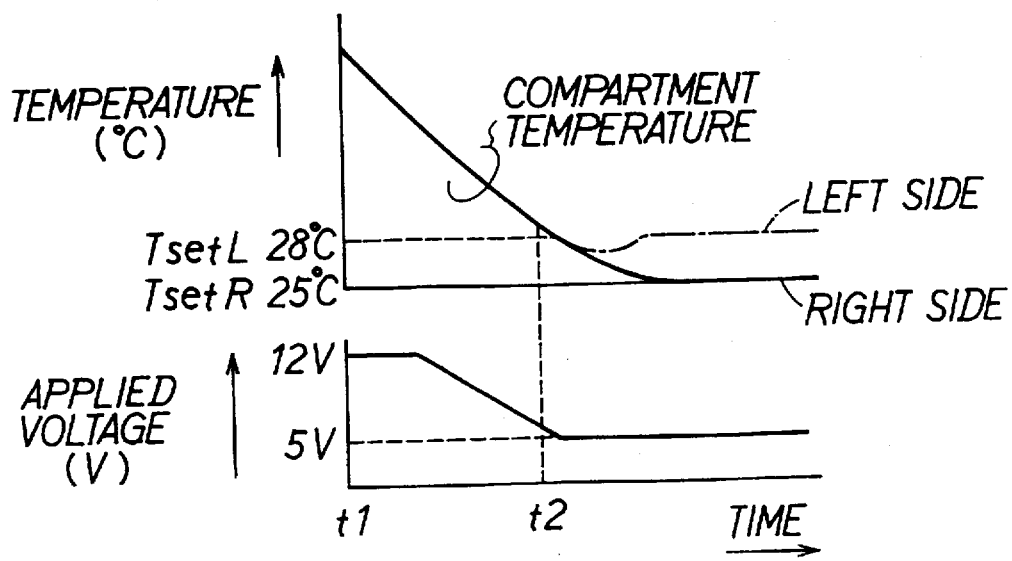
FIG. 6 is a time chart illustrating the operation of the first embodiment.

An example of the operation of the above embodiment will be described with reference to the time chart of FIG. 6.

When the compartment temperature is considerably high, for example, when the engine is started during the summer, the automatic air-conditioner is started in the state where the set temperature TsetR set by first temperature setting means 45 is 25° C. and the set temperature TsetL set by second temperature setting means 46 is 28° C. (time t1). Then, the transitional period determination means of controller 9 determines that the system is in a transitional period and the air flow rate compensating means assumes that the set temperature TsetL set by second temperature setting means 46 is 25° C. As a result, the air flow rate determining means determines the air flow rate according to the mean value of the target blowout temperatures TAOR and TAOL (the same value) set based on the set temperature from which the larger deviation is produced (25° C.).

As the air flow rate to be determined has been set based on the set temperature from which the larger deviation is produced (25° C.). a larger air flow rate is obtained as compared with conventional cases. As a result, the temperatures of the right-hand side air-conditioning zone and left-hand side air-conditioning zone quickly approach respective set temperatures.

Then, when the compartment temperature falls and both the deviations of the compartment temperature Tr from the set temperature TsetR of first temperature setting means 45 and from the set temperature TsetL of second temperature setting means 46 become within the preset temperature difference (within 5° C.), the air-conditioning state is determined to be in a steady state (time t2). Then, the air flow rate is determined according to the mean value of the right-hand side target blowout temperature TAOR calculated based on the set temperature TsetR being 25° C. and the left-hand side target blowout temperature TAOL calculated based on the set temperature TsetL being 28° C.

In the air-conditioning system for a motor vehicle according to the first embodiment, the air flow rate is determined based on the set temperature from which the larger deviation is produced during the transitional period as described in the above operational example of the first embodiment. Accordingly, even if the set temperature TsetR set by first temperature setting means 45 is not the same as the set temperature TsetL set by second temperature setting means 46, a larger air flow rate is obtained in the transitional period compared with conventional cases. Thus, the first embodiment allows the temperatures of the right-hand side and left-hand side air-conditioning zones to quickly approach the respective set temperatures.

In the above embodiment, the situation has been described where the set temperature is instantaneously switched when the system moves between a transitional period and steady state. The set temperature may also be gradually changed using a time constant, whereby any trouble caused by rapid changes in the air flow rate can be eliminated.

In the above embodiment, a case is described where the situation is determined to be in the transitional period when the deviations of the compartment temperature from respective set temperatures exceed the preset value. It is also acceptable, however, that the determination that the system is in a transitional period or steady state is made based on the difference between the mean value of both the set temperatures and the compartment temperature.

Further, in the above embodiment, a case is described where the air flow rate is calculated, when the system reaches steady state, based on the mean value of the target blowout temperature TAOR of the right-hand side air-conditioning zone and the target blowout temperature TAOL of the left-hand side air-conditioning zone. It is also acceptable, however, that the air flow rate (applied voltage: VR) adequate for the right-hand side air-conditioning zone is calculated from the target blowout temperature TAOR of the right-hand side air-conditioning zone, the air flow rate (applied voltage: VL) adequate for the left-hand side air-conditioning zone is calculated from the target blowout temperature TAOL of the left-hand side air-conditioning zone, and the mean value of the right-hand side applied voltage and left-hand side applied voltage is set to be the air flow rate.

Also, in the above embodiment, a case is described where the air flow rate is determined by equalizing both the set temperatures on the assumption that the set temperature from which the smaller deviation is produced is equal to the set temperature from which the larger deviation is produced. However, it is also acceptable that the applied voltage VR calculated from the target blowout temperature TAOR corresponding to the first deviation is compared with the applied voltage VL calculated from the target blowout temperature TAOL corresponding to the second deviation, and the higher applied voltage is determined as the applied voltage of the air blower.

The above embodiment describes a situation where only one compartment temperature sensor is provided. It is also acceptable, however, that a compartment temperature sensor be provided for each zone so that, for example, the temperature TrR of the first air-conditioning zone and the temperature TrL of the second air-conditioning zone can be separately detected. It is also acceptable that the right-hand side target blowout temperature TAOR and the left-hand side target temperature TAOL are calculated by the following equations:

$$TAOR = Kset \cdot TsetR - KrR \cdot TrR - Kam \cdot Tam - Ks \cdot Ts + Kd(TsetL - TsetR) + C \quad (5)$$

$$TAOL = Kset \cdot TsetL - KrL \cdot TrL - Kam \cdot Tam - Ks \cdot Ts + Kd(TsetL - TsetR) + C \quad (6)$$

where, Kset is the temperature setting gain, KrL and KrR are the compartment temperature gains, Kam is the ambient temperature gain, Ks is the solar radiation gain, Kd is the temperature difference gain, and C is a coefficient of compensation.

Another modification to the above-described embodiment is with respect to the solar radiation sensor. Instead of having only a single radiation sensor, it is possible that a sunlight radiation sensor is provided for each zone so that, for example, the solar radiation quantity TsR of the first air-conditioning zone and the sunlight radiation quantity TsL of the second air-conditioning zone can be separately detected. If the embodiment is so modified, it is acceptable to calculate the right-hand side target blowout temperature TAOR and the left-hand side target temperature TAOL using the following equations:

$$TAOR = KsetR \cdot TsetR - Kr \cdot Tr - Kam \cdot Tam - KsR \cdot TsR + KdR(TsetL - TsetR) + CR \quad (7)$$

$$TAOL = KsetL \cdot TsetL - Kr \cdot Tr - Kam \cdot Tam - KsL \cdot TsL + KdL(TsetL - TsetR) + CL \quad (8)$$

where, KsetR and KsetL are the temperature setting gains, Kr is the compartment temperature gain, Kam is the ambient temperature gain, KsR and KsL are the solar radiation gains, KdR and KdL are the temperature difference gains, and CR and CL are coefficients of compensation.

Instead of being applied to right and left air-conditioning zones, the first embodiment may be applied to a system that is divided into front and rear zones. Furthermore, the system may be altered so as to work with more than two zones. For example, each of the front and rear seats of a motor vehicle, i.e. front driver side, front passenger side, rear driver side, and rear passenger side, is adapted to function as an air-conditioning zone.

The first embodiment describes the situation where the temperature can be separately set for the first and air-conditioning zones. It is also possible, however, that the temperature of one air-conditioning zone is set by a temperature setting device while the temperature of the other air-conditioning zone is set by an offset setting device which offsets the temperature set by the above temperature setting device.

Figure 7:
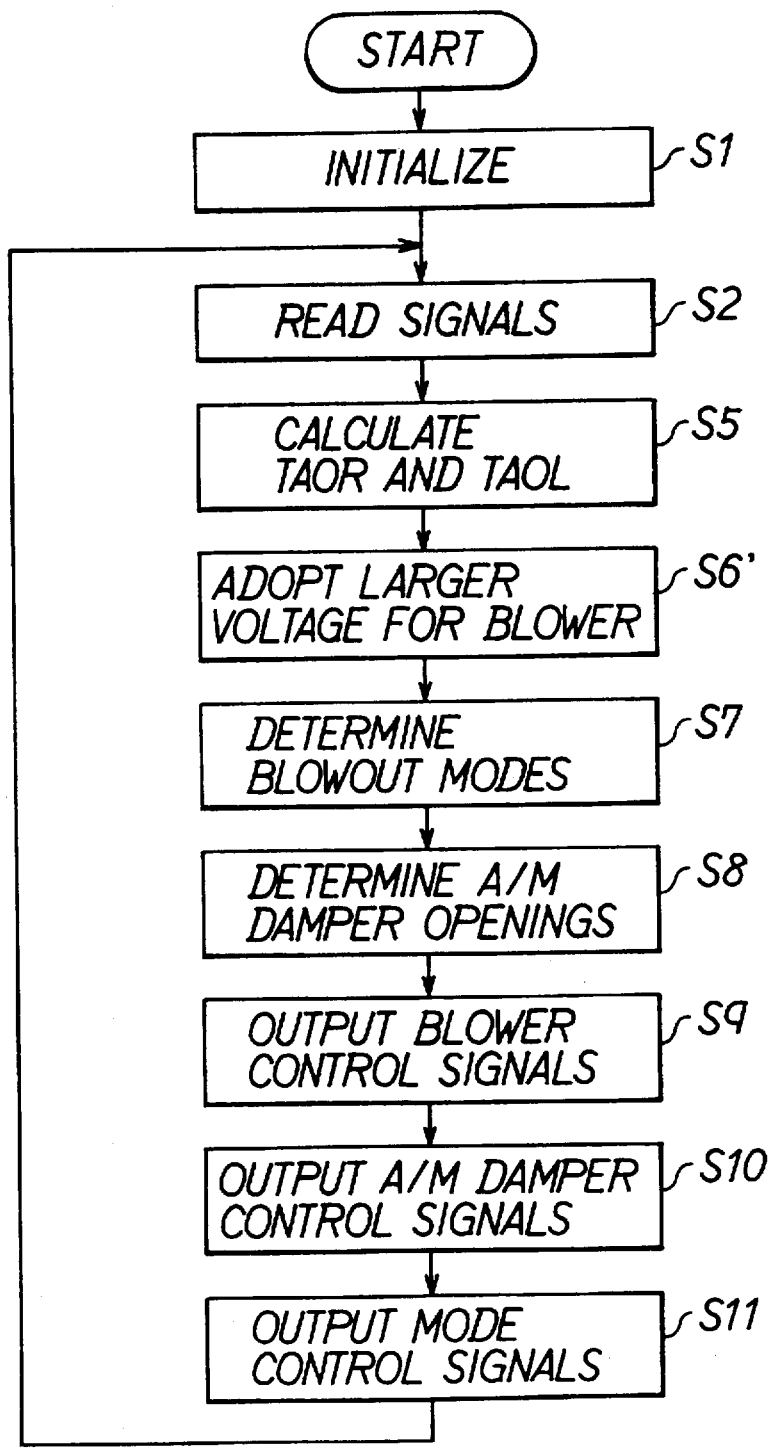
FIG. 7 is a flowchart illustrating the operation of the controller of the second embodiment.
Figure 8:
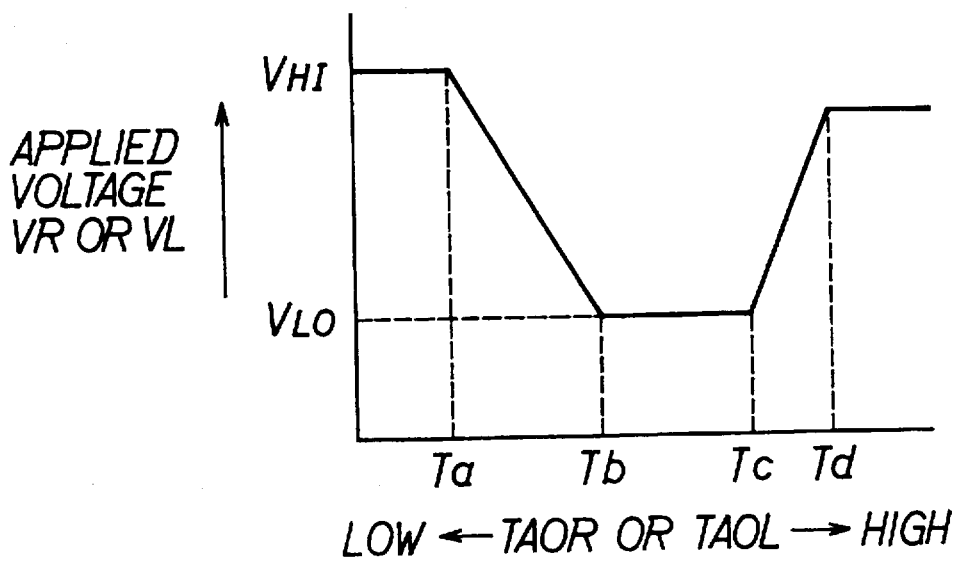
FIG. 8 is a graph illustrating the relationship between the target blowout temperature TAOR or TAOL and the applied voltage VR or VL of the air blower in the second embodiment.

FIGS. 7 and 8 illustrate the second embodiment according to the present invention. FIG. 7 is a flow chart illustrating the operation of the controller, and FIG. 8 is a graph indicating the relation between the right-hand side target blowout temperature TAOR or the left-hand side target blowout temperature TAOL and the applied voltage VR or VL of the air blower.

Controller 9 of this embodiment, with reference to FIG. 1 illustrating the control mechanism and FIG. 2 illustrating the system components, includes an air flow rate determining means that calculates the applied voltage VR adequate to the right-hand side air-conditioning zone from the target blowout temperature TAOR of the right-hand side air-conditioning zone and calculates the applied voltage VL adequate to the left-hand side air-conditioning zone from the target blowout temperature TAOL of the left-hand side air-conditioning zone. Furthermore, controller 9 adopts the larger applied voltage as the voltage to be applied to air blower 4. As a result, there is no need to make a determination as to whether the system is in a steady state or in a transitional state.

The operation of controller 9 according to the second embodiment will be described with reference to the flow-chart of FIG. 7.

The flow chart of this embodiment differs from that of the first embodiment only in that Step S3 and Step S4 have been eliminated and the process of Step S6' differs from Step S6. All the remaining steps are the same as those numbered similarly in FIG. 3.

In Step S6', the applied voltage VR adequate to the right-hand side air-conditioning zone is calculated from the target blowout temperature TAOR, and the applied voltage VL adequate to the left-hand side air-conditioning zone is calculated from the target blowout temperature TAOL. Then, the applied voltage VR is compared with the applied voltage VL, and the larger applied voltage is adopted as the applied voltage V of the air blower, with this process corresponding to the operation of the air flow rate determination means.

In the air-conditioning system for a motor vehicle according to the second embodiment, as described in the above mode of operation, the air flow rate is set to the air flow rate of the side with the larger air flow rate, i.e., with the larger deviation, whether the system is in a steady state or in a transitional period. Therefore, the air flow rate is large in both the transitional period and the steady state. As a result, the temperatures of the right-hand side air-conditioning zone and the left-hand side air-conditioning zone are able to quickly approach the respective set temperatures.

In this embodiment, the situation has been described above where the applied voltage VR calculated from the target blowout temperature TAOR corresponding to the first deviation is compared with the applied voltage VL calculated from the target blowout temperature TAOL corresponding to the second deviation. It is also possible, however, that the first deviation is directly compared with the second deviation and the air flow rate is determined based on the larger deviation. That is, as in the first embodiment, it is acceptable that the air flow rate is determined by equalizing both set temperatures on the assumption that the set temperature from which the smaller deviation is produced is equal to the set temperature from which the larger deviation is produced.

Figure 10:
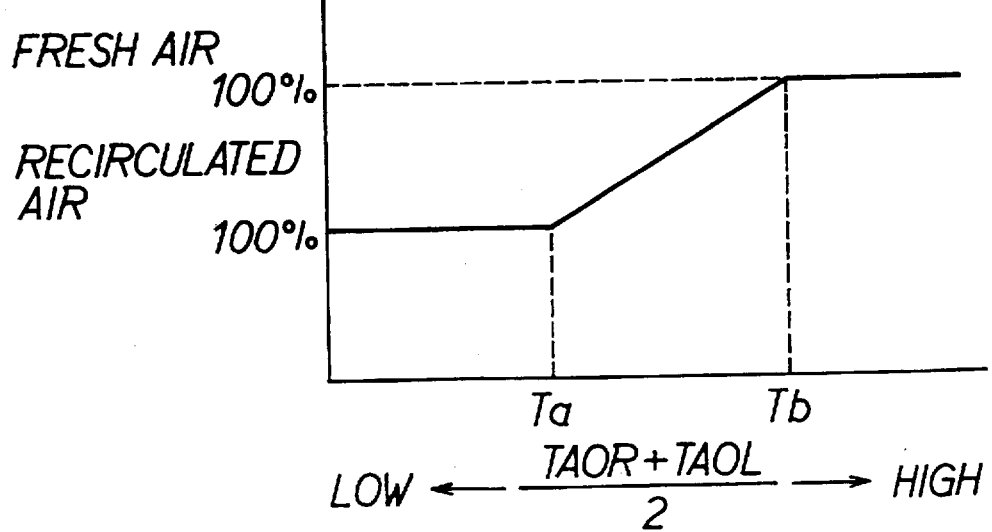
FIG. 10 is a graph illustrating the relationship between the mean value of the target blowout temperatures TAOR and TAOL and the guidance ratio of the fresh air to the recirculated air in the third embodiment.
Figure 9:
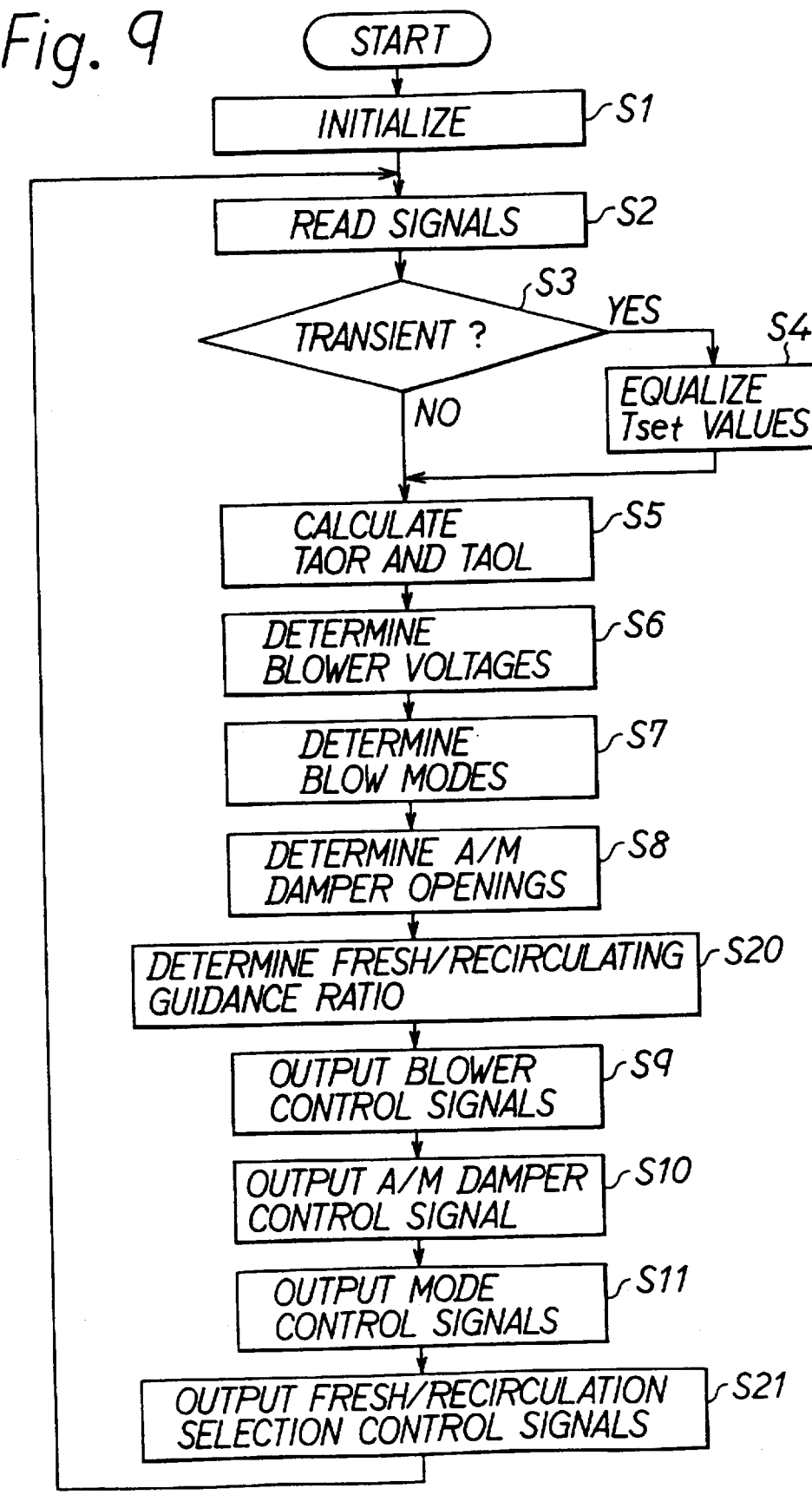
FIG. 9 is a flowchart illustrating the operation of the controller of the third embodiment.

FIGS. 9 and 10 illustrate the third embodiment according to the present invention. FIG. 9 is a flowchart illustrating the operation of controller 9. FIG. 10 is a graph illustrating the relation between the mean value of the right-hand side and left-hand side target blowout temperatures TAOR and TAOL and the guidance ratio of the fresh air to the recirculated air. Refer to FIGS. 1 and 2 for the controller structure and the system structure.

Fresh/recirculated air selection device 3 of the third embodiment is automatically controlled by controller 9 (as disclosed with respect to the first embodiment). Controller 9 comprises a fresh/recirculated air determination means for determining the guidance ratio of the fresh air to the recirculated air selected by the fresh/recirculated selection means 3 based on the set temperature set by first temperature setting means 45, the set temperature set by second temperature setting means 46, and the compartment temperature detected by compartment temperature sensor 47.

The fresh/recirculated air determination means according to this embodiment determines the guidance ratio of the fresh air to the recirculated air based on the mean value of the right-hand side target blowout temperature TAOR and left-hand side target blowout temperature TAOL as indicated by FIG. 10.

Controller 9 includes a transition period judging means that judges the system to be in a transitional period when the first deviation of the compartment temperature detected by compartment temperature sensor 47 from the set temperature set by first temperature setting means 45 is larger than a specified value or when the second deviation of the compartment temperature detected by compartment temperature sensor 47 from the set temperature set by second temperature setting means 46 is larger than the specified value.

Controller 9 further comprises a fresh/recirculated air compensating means that, when the transitional period determination means determines the system to be in the transitional period, compares the first deviation with the second deviation and determines the fresh/recirculated air selection based on the larger deviation.

The operation of controller 9 will now be described with reference to the flowchart illustrated in FIG. 9.

Steps S1 through S8 are the same as those of the first embodiment, wherein the operation of Step S4 corresponds to the operation of the fresh/recirculated air compensating means. Step S20 follows Step S8. In Step S20, the guidance ratio of the fresh air to the recirculated air selected by fresh/recirculated selecting means 3 is determined based on the mean value of the right-hand side target blowout temperature TAOR and the left-hand side target blowout temperature TAOL and the graph illustrated in FIG. 10, which corresponds to the operation of the fresh/recirculated determining means.

Steps S9 through S11 are the same as those of the first embodiment. Step S21 follows Step S11. In Step S21, control signals are output to fresh/recirculated selection actuator 8 driving fresh/recirculated air selecting damper 7 so that the guidance ratio of the fresh air to the recirculated air calculated in Step S20 can be achieved.

After Step S21, the process returns to Step S2, and the above cycle is repeated at a rate of approximately 0.25 Hz.

In the air-conditioning system for a motor vehicle according to the third embodiment, as described above, the guidance ratio of the fresh air to the recirculated air is set based on the set temperature of the side at which the larger deviation is produced in the transitional period. Accordingly, even if the set temperature set by first temperature setting means 45 differs from the set temperature set by second temperature setting means 45, the recirculated air is blown out in a larger quantity during a quick cooling mode, during the transitional period, to quickly cool the compartment, whereby the temperatures of the first air-conditioning zone and second air-conditioning zone quickly approach the respective set temperatures. On the other hand, in a quick heating mode, during the transitional period, the fresh air is blown out at a higher flow rate to quickly lower the humidity of the first air-conditioning zone and of the second air-conditioning zone, whereby windshield fogging can be prevented.

In the third embodiment, it is also acceptable that the fresh/recirculated air compensating means is operated only in the quick cooling mode.

Figure 11:
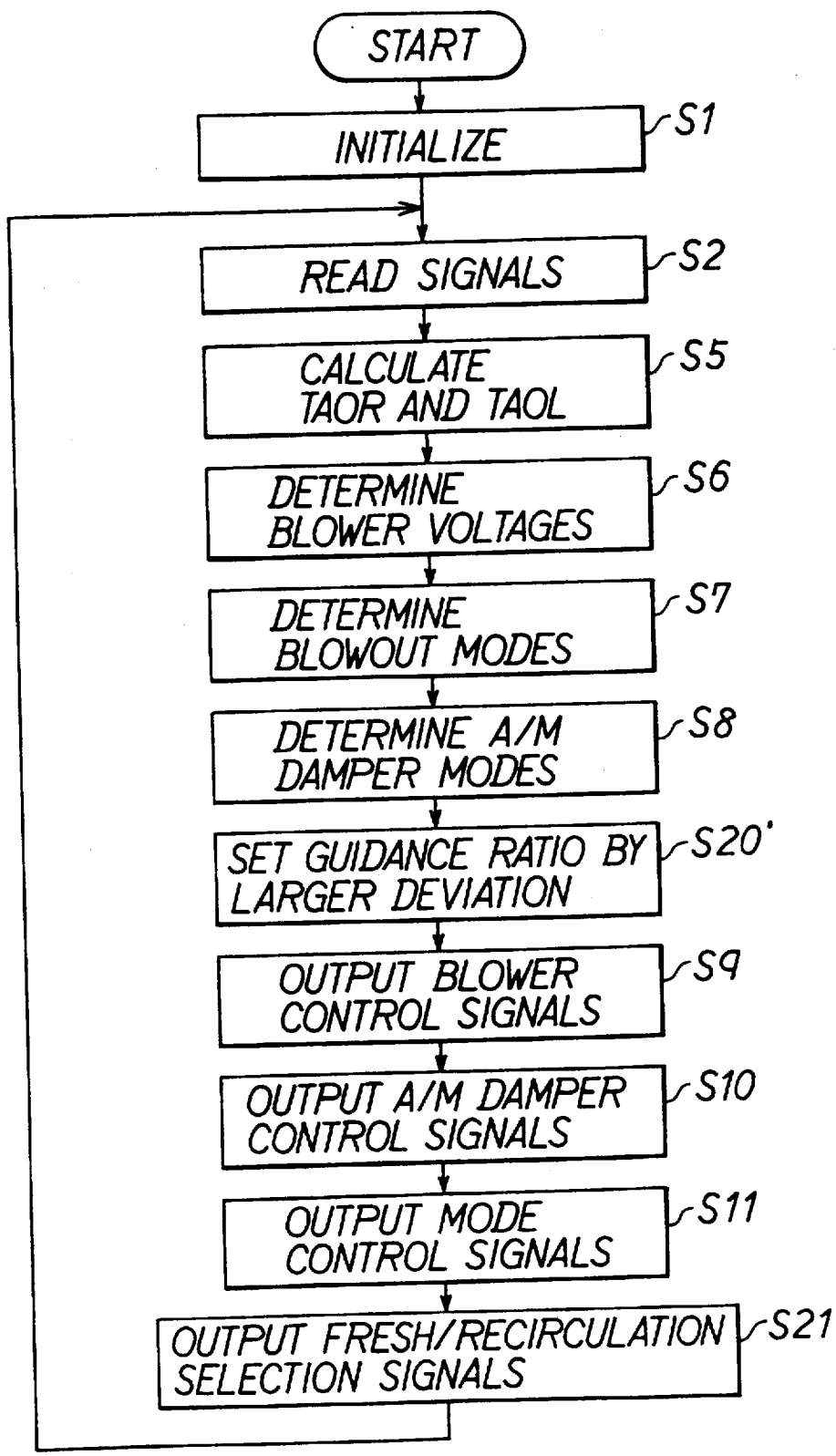
FIG. 11 is a flowchart illustrating the operation of the controller of the fourth embodiment.
Figure 12:
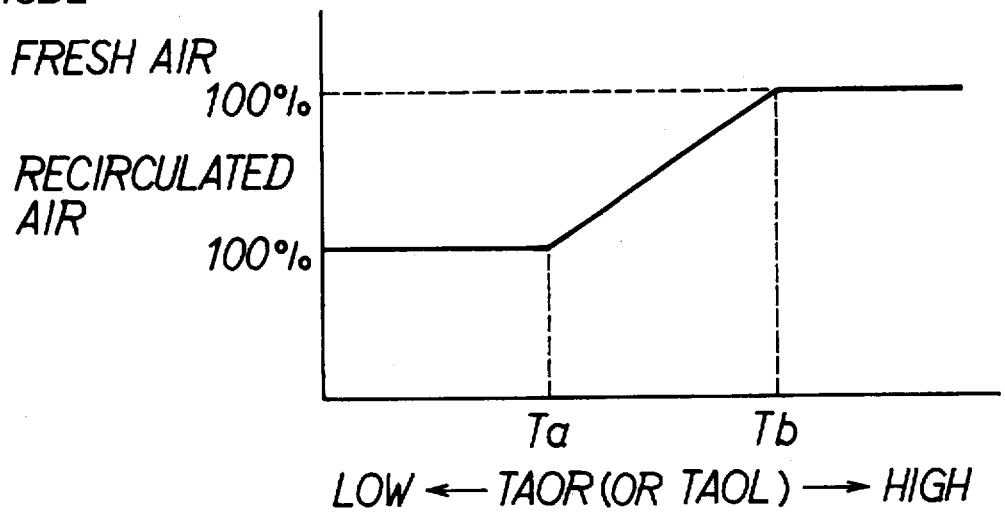
FIG. 12 is a graph illustrating the relationship between the target blowout temperature TAOR or TAOL and the guidance ratio of the fresh air to the recirculated air in the fourth embodiment.
Figure 13:
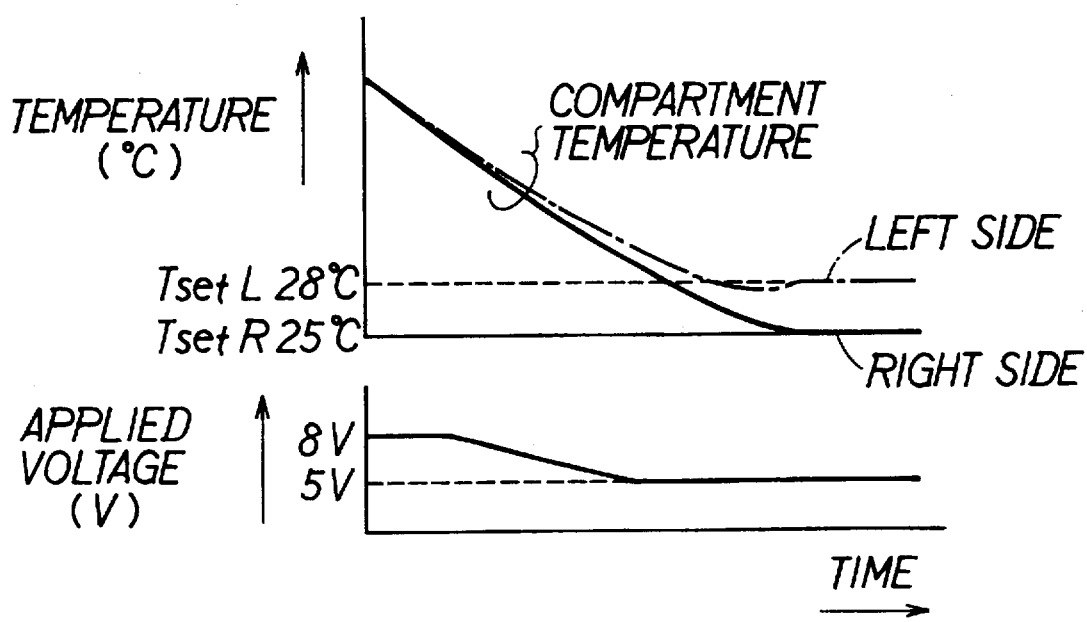
FIG. 13 is a time chart illustrating the operation of a conventional air-conditioning system.

FIGS. 11 and 12 illustrate the fourth embodiment according to the present invention. FIG. 11 is a flowchart illustrating the operation of the controller. FIG. 12 is a graph illustrating the relation between the target blowout temperature TAO and the guidance ratio of the fresh air to the recirculated air. Again, the structure of the system is shown in FIG. 2 and the structure of the controller is shown in FIG. 1.

Controller 9 according to the fourth embodiment includes a fresh/recirculated air determining means which compares the first deviation of the compartment temperature detected by compartment temperature sensor 47 from the set temperature set by first temperature setting means 45 with the second deviation of the compartment temperature detected by compartment temperature sensor 47 from the set temperature set by second temperature setting means 46. Controller 9 also determines the guidance ratio of the fresh air to the recirculated air selected by fresh/recirculated air selecting means 3 based on the larger deviation. By adopting this control, a determination as to whether the system is in the steady state or in a transitional period is not necessary.

The fresh/recirculated air determining means according to the fourth embodiment compares the first deviation with the second deviation and determines the guidance ratio of the fresh air to the recirculated air in accordance with the target blowout temperature TAOR at the side from which the larger deviation is produced as depicted in the graph of FIG. 12.

Next, the operation of controller 9 will be described with reference to the flowchart of FIG. 11.

The flow chart of this embodiment differs from that of the third embodiment in that Steps S3 and S4 have been eliminated and the process in Step S20' differs from that of Step S20. The other steps remain the same as those of the third embodiment.

In Step S20', the first deviation of the compartment temperature detected by compartment temperature sensor 47 from the set temperature TserR set by first temperature setting means 45 (|TsetR−Tr|) is compared with the second deviation of the compartment temperature detected by compartment temperature sensor 47 from the set temperature TserL set by second temperature setting means 46 |TsetL−Tr|). The guidance ratio of the fresh air to the recirculated air is determined according to the target blowout temperature TAOR (or TAOL) of the side at which the larger deviation is produced. The graph illustrated in FIG. 12 illustrates the operation of the fresh/recirculated air determining means.

In the air-conditioning system for a motor vehicle according to the fourth embodiment, as described above, the guidance ratio of the fresh air to the recirculated air is determined based on the set temperature of the side at which the larger deviation is produced, whether or not the system is in a steady state or in a transitional period. Accordingly, even if the set temperature set by first temperature setting means 45 differs from the set temperature set by second temperature setting means 46, the recirculated air is blown out at a higher flow rate in the quick cooling mode, during the transitional period, to quickly cool the compartment, so that the temperatures of the first air-conditioning zone and the second air-conditioning zone quickly approach the respective set temperatures. In the quick heating mode, during the transitional period, the fresh air is blown out at a higher flow rate to quickly lower the humidity of the first air-conditioning zone and the second air-conditioning zone, whereby windshield fogging can be prevented.

This invention has been described in connection with what are presently considered to be the most practical and preferred embodiments. However, this invention is not to be limited to the disclosed embodiments, but rather is meant to include all modifications and alternative arrangements included within the spirit and scope of the appended claims.

What is claimed is:

1. An air-conditioning system for a motor vehicle, said system comprising:
   a first air passage for sending air to a first air-conditioning zone in a passenger compartment;
   a second air passage for sending air to a second air-conditioning zone in said passenger compartment;
   an air blower for blowing air within said first air passage and said second air passage towards said passenger compartment;
   first temperature setting means for setting a first set temperature of said first air-conditioning zone;
   second temperature setting means for setting a second set temperature of said second air-conditioning zone;
   compartment temperature detecting means for detecting a compartment temperature of said passenger compartment;
   transitional period determination means for determining that said system is in a transitional period when at least one of: 1) a first deviation of the compartment temperature from said first set temperature is larger than a specified value and 2) a second deviation of the compartment temperature from said second set temperature is larger than the specified value;
   first air flow rate determination means for determining an air flow rate of said air blower based on one of said first set temperature and said second set temperature from which a deviation of said compartment temperature is larger, and on said compartment temperature, when said transitional period determination means determines said system to be in a transitional period;
   second air flow rate determination means for determining said air flow rate of said air blower based on said first set temperature, said second set temperature and said compartment temperature when said transitional period determination means determines that said system is not in said transitional period; and
   air flow rate control means for controlling said air blower based on said air flow rate determined by said first and second air flow rate determination means.

2. An air conditioning system according to claim 1, further comprising:
   first target air temperature determining means for determining a first target air temperature based on said first set temperature and on said compartment temperature; and
   second target air temperature determining means for determining a second air temperature based on said second set temperature and on said compartment temperature;
   wherein said first air flow rate determination means is for determining said air flow rate based on one of said first target air temperature and said second target air temperature from which a deviation of said compartment temperature is larger, when said transitional period determination means determines that said system is in said transitional period.

3. An air conditioning system according to claim 2, further comprising:
   setting means for setting one of said first set temperature and said second set temperature from which a deviation of said compartment temperature is smaller, to be the same as a set temperature from which said deviation is larger; and
   mean value calculating means for calculating a mean value of said first target air temperature and said second target air temperature based on said first and second set temperatures as determined by said setting means;
   wherein said first air flow rate determination means is for determining said air flow rate based on said mean value calculated by said mean value calculating means.

4. An air-conditioning system for a motor vehicle, said system comprising:
   a first air passage for sending air to a first air-conditioning zone in a passenger compartment;
   a second air passage for sending air to a second air-conditioning zone in said passenger compartment;
   an air blower for blowing air within said first air passage and said second air passage towards the passenger compartment;
   first temperature setting means for setting a first temperature of said first air-conditioning zone;
   second temperature setting means for setting a second temperature of said second air-conditioning zone;
   compartment temperature detecting means for detecting a compartment temperature of said passenger compartment; and
   a controller having air flow rate determining means for determining an air flow rate of said air blower based on said first temperature, said second temperature and the compartment temperature
   wherein said controller includes
      transitional period determination means for determining the system to be in a transitional period when at least one of: 1) a first deviation of compartment temperature from said first temperature is larger than a specified value and 2) a second deviation of the compartment temperature from said second temperature is larger than the specified value, and
      air flow rate compensating means for increasing the air flow rate determined by said air flow rate determining means based on a larger one of said first deviation and said second deviation when said transitional period determination means determines the air conditioner to be in the transitional period.

5. An air conditioning system according to claim 4, further comprising:
   first target air temperature determining means for determining a first target air temperature based on said first set temperature and on said compartment temperature; and
   second target air temperature determining means for determining a second air temperature based on said second set temperature and on said compartment temperature;
   wherein said air flow rate compensating means is for increasing said air flow rate based on one of said first target air temperature and said second target air temperature from which a deviation of said compartment temperature is larger when said transitional period determination means determines said system to be in said transitional period.

6. An air conditioning system according to claim 5, said air flow rate determination means further comprising:
   setting means for setting one of said first set temperature and said second set temperature from which a deviation of said compartment temperature is smaller, to be the same as a set temperature from which said deviation is larger; and
   mean value calculating means for calculating a mean value of said first target air temperature and said second target air temperature based on said first and second set temperatures as determined by said setting means;

wherein said air flow rate compensating means is for increasing said air flow rate based on said mean value calculated by said mean value calculating means.

7. An air-conditioning system for a motor vehicle, said system comprising:

a first air passage for sending air to a first air-conditioning zone in a passenger compartment;

a second air passage for sending air to a second air-conditioning zone in said passenger compartment;

an air blower for blowing air within said first air passage and said second air passage towards said passenger compartment;

first temperature setting means for setting a first set temperature of said first air-conditioning zone;

second temperature setting means for setting a second set temperature of said second air-conditioning zone;

compartment temperature detecting means for detecting a compartment temperature of said passenger compartment;

air flow rate determination means for determining an air flow rate of said system based on one of said first set temperature and said second set temperature from which a deviation of said compartment temperature is larger, and on said compartment temperature; and air flow rate control means for controlling said air flow based on said air flow rate determined by said air flow rate determination means;

wherein said air flow rate determination means is further for setting a value of one of said first and second set temperatures from which said deviation of said compartment temperature is smaller to a value of one of said first and second set temperatures from which said deviation of said first and second set temperatures is larger to obtain a set of revised set temperatures, and for determining said air flow rate based on said set of revised set temperatures.

8. The system of claim 7, wherein said air flow rate control means is for controlling said air blower based on said air flow rate determined by said air flow rate determination means.

9. The system of claim 7, further comprising:

a fresh/recirculated air selection damper for selectively controlling relative amounts of fresh and recirculated air introduced into said system;

wherein said air flow rate control means is for controlling said fresh/recirculated air selection damper based on said air flow rate determined by said air flow rate determination means.

* * * * *